March 10, 1931.  G. B. BAILEY  1,795,418
AUTOMATIC DRIER CONTROL
Filed March 2, 1928

INVENTOR:
George B. Bailey
by Macleod, Calver, Copeland & Dike
Attys.

Patented Mar. 10, 1931

1,795,418

UNITED STATES PATENT OFFICE

GEORGE B. BAILEY, OF SHARON, MASSACHUSETTS

AUTOMATIC DRIER CONTROL

Application filed March 2, 1928. Serial No. 258,656.

The invention relates to a new and useful improvement in means for controlling the drying rate in a drier for any material which it is desired to dry. The object of the invention is to provide an automatic control of the humidity within the drier and thereby control the drying rate. The invention consists in the automatic positive introduction of dry air into the drier or the automatic positive expulsion of wet or moist air from the drier whereby the air within the drier may be maintained at a predetermined substantially constant degree of humidity.

At a given temperature it is only possible to dry any substance at a rate of speed which equals the rate at which the moisture is travelling to the surface of the substance. For instance, it is very wasteful, as well as practically impossible, to attempt to dry faster than the moisture is coming to the surface of the substance which is being dried. By controlling the moisture content of the air within a drier the drying rate of the air can be controlled inasmuch as an increase in the amount of moisture in the air causes a decrease in the drying rate. Therefore, if we determine the rate of speed at which the moisture is coming to the surface of any particular substance at a given temperature, then by automatically controlling the moisture content or humidity of the air we can make the drying rate such as to take care of the absorption of the moisture coming to the surface of the material being dried.

Apparatus embodying the invention consists mainly in the following: A heated convecting surface over which a constant recirculation of the air from and to the drier is provided by a propeller fan or other suitable means. Second, a thermostat with a bulb in the drier circuit and controlling the temperature of this air by controlling the supply of the heating medium to the convecting surface. Third, another thermostat located within the drier circuit and having a wet jacketed bulb which controls the humidity of the air in the drier circuit by controlling a blower or fan which exhausts air out of or blows air into the drier circuit.
If no air is added to or taken out during the drying process the humidity must increase during the drying. When the humidity has reached the desired maximum it can then be held at that point by regulating the amount of dry air which is allowed to pass into the drier or by regulating the amount of humid air which is expelled from the drier. The wet bulb being placed in the fast circulating air within the duct registers or responds to the true psychometric wet bulb temperature corresponding to the humidity within the drier. Therefore if the drying process is desired to proceed at a certain temperature and humidity the operator sets his controls to this temperature and to the corresponding wet bulb temperature. When the wet bulb temperature begins to exceed that for which the thermostat is set the thermostat cuts in the fan or blower which forces in dry air or exhausts the wet air. This causes a drop in humidity which causes the thermostat to stop the fan or blower when the humidity has dropped to the predetermined degree.

In any drying process the higher the relative humidity that we reach the more efficiently the drying can be done.

In an apparatus embodying my invention and in the method of practicing my invention the drier is a relatively enclosed drying space and when an apparatus embodying the invention is attached to the drier it makes a variably enclosed circuit consisting of the enclosed space or drier, a duct in which there is placed a convecting surface to heat the air and a propelling device or impelling device to recirculate the air. The apparatus comprises essentially the following: In connection with a drier there is provided a duct enclosing a heat convecting surface and a propelling fan which, when both the inlet and the outlet of the duct are connected to the said enclosed drier space, causes the air to be circulated from the drier through the duct and exposed to the heat from the convecting surface, and then returned into the enclosed drier space. This duct and relatively enclosed space will be hereinafter termed the drier circuit.

A thermostatic element is placed in the duct for controlling the admission of the heating medium to the convecting surface. This control is adjustable to any desired temperature.

Another thermostatic element is provided with a wet bulb and a wick which dips into a pan of water placed within the duct and this thermostatic element being directly in the path of the recirculated air will register at a temperature corresponding to the wet bulb temperature of the air within the drier. This thermostatic element will automatically actuate an electric switch which cuts in and out a blower or fan which introduces dry air into the drier circuit or expels wet air from the drier circuit, thereby maintaining any desired constant condition of humidity within the drier. This thermostatic mechanism is adjustable to any desired wet bulb temperature corresponding to any desired condition of humidity.

The invention will be fully understood from the following description when taken in connection with the accompanying drawings, and the novel features thereof will be pointed out and clearly defined in the claims at the close of this specification.

Figure 1:
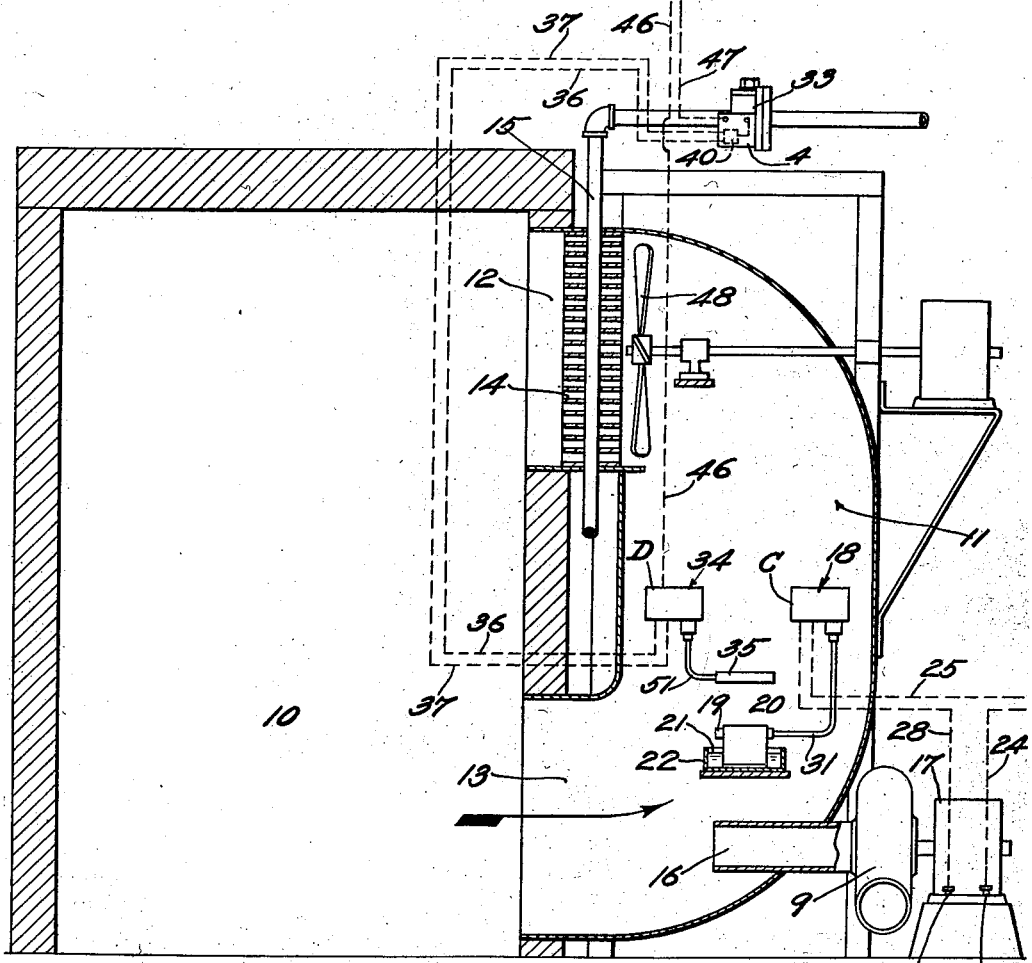
Fig. 1 is a side elevation partly in diagram and partly in section showing a device embodying the invention.
Figure 2:
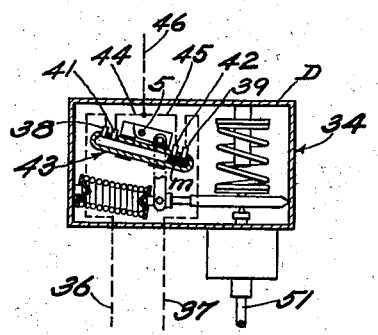
Fig. 2 is an enlarged sectional view of the dry bulb thermostatic mechanism.

Referring to the drawings there is shown at 10 a relatively enclosed space representing the drier with which is connected the control mechanism embodying the invention. Connected with the drier 10 is an air duct 11 located on the outer side of the side wall of the drier space and having an inlet 12 which opens into the interior of the drier and an outlet 13 from the drier into the duct whereby there is permitted a continuous recirculation of air through the drier into the duct, thence through the duct, thence from the duct to the inlet 12 back into the drier. Located within the duct, preferably in the upper part thereof near the inlet opening 12 to the drier, is a heating unit 14 which is provided with heat convecting surfaces. In the form shown in the drawings the heating unit 14 is heated by the medium of a steam pipe 15. At 48 is shown a motor-operated fan mounted within the duct adjacent the heating unit 14 to keep the air in circulation.

Within the duct 11 is a wet bulb thermostat 18 having a wet bulb 19 of any type. This bulb is kept moist by a wick 20 which dips into water 21 in a pan 22.

The thermostat 18 (see Fig. 3) is provided with a mercury tube switch 27 which is pivoted intermediate its ends at 8 in a casing C and is connected by a series of levers with a diaphragm or bellows (not shown) which in turn is actuated by a thermostatic fluid enclosed in a tube 31 of the wet bulb 19.

At 9 is shown a blower located outside of the duct 11 and having connection through pipe 16 with the interior of the duct whereby air may be exhausted from said duct and thereby cause the air to be exhausted from the drier with which the duct is connected. The blower is driven by an electric motor 17.

One terminal 23 of the motor 17 is connected by a wire 24 with one pole of an electric socket (not shown) and the other pole of the electric socket is connected by a wire 25 with a contact member 26 in the casing C of the thermostat 18. The terminal 30 of the motor is connected by a wire 28 with a contact member 29 in the casing C of the thermostat 18. The contact members 26 and 29 are connected to one end of the mercury tube 27 and are adapted to dip into the mercury $m$ in said tube thereby closing the circuit through the motor to set the blower 9 in operation when the mercury tube is tipped from the position shown in Fig. 3 into an oppositely inclined position to cause the mercury to flow into the end of the tube with which the contact members 26 and 29 are connected.

According to a well known law the evaporation of water from the wick 20 will cause reduction of temperature and the more rapid and greater the evaporation the more rapid and greater will be the reduction of temperature. It is also well known that the rate of evaporation will vary with the humidity of the air which surrounds the wick. Therefore as the wet bulb is exposed to the air which is being circulated through the drier and the duct, the rate of evaporation will vary with the degree of humidity in the drier, that is the greater the humidity the slower will be the evaporation and the higher the temperature of the vaporized water.

Figure 3:
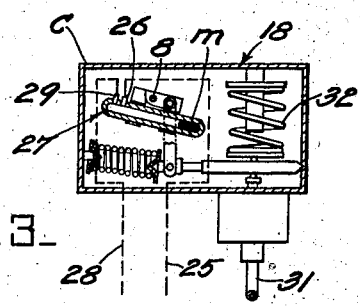
Fig. 3 is an enlarged sectional view of the wet bulb thermostatic mechanism.

When the temperature of the wet bulb rises above a predetermined degree the levers will be moved against the pressure of spring 32 due to the expansion of the thermostatic fluid and turn the mercury tube 27 on its fulcrum from the position shown in Fig. 3 in which the contact is shown broken, into an inclined position such that the mercury will flow toward the left end of the tube and make the mercury contact with the wires 25 and 28. When the temperature of the wet bulb again falls below the predetermined degree the contraction of the thermostatic fluid will permit the spring 32 to actuate the lever and tube 27 back to the position shown in Fig. 3 so that the mercury contact will be opened as shown in said Fig. 3. When the circuit is closed the blower 9 will be operative to either blow dry air into the duct or to exhaust the humid air from the duct according to requirements. The same results are obtained by either blowing dry air into or exhausting humid air from the duct.

It is to be understood that the drier chamber 10 is not sealed air tight but as usual in driers of this character as constructed there are numerous crevices in the walls through which the air from the interior of the drier can escape or fresh air may be drawn in to compensate for the air which is drawn into the drier through the pipe 16 or which is expelled through the pipe 16.

Differences in humidity and temperature of air affect materially the volume of air and the action of the blower compensates for this volumetric variation which occurs without regard to normal capacity of drier space. As the capacity of the blower is in excess of greatest requirements including structure leakages, etc., it can operate as described. If volume of air is increased in excess of capacity of atmospheric pressure, a corresponding plus pressure will result. If the blower exhausts air below atmospheric pressure the tendency toward vacuum will cause introduction of atmospheric pressure and air will enter. If the structure leakage is not sufficient, a simpler system of check valves should be employed.

The thermostat can be adjusted in well known manner so that the circuit will be closed and the blower started when the temperature rises above a predetermined degree. Therefore when the humidity rises to a certain point whereby the rate of evaporation falls below a certain rate so that the wet bulb temperature is above a predetermined point the circuit will be closed and the blower will be set in operation to draw humid air out of the duct and drier, allowing dry air to take its place or it will blow dry air into the duct until the humidity falls to the requisite point for the evaporation to cool the air sufficiently to allow the thermostatic fluid to contract and permit the circuit to be broken and stop the blower.

Normal temperature of the air when the humidity is not above the predetermined point of starting the blower 9 is kept up to at least a predetermined degree by the convecting surfaces of the heating unit 14. The heating medium for the unit 14 is supplied through the conducting member 15 having a thermostatically controlled motor valve 33. This valve is controlled by a thermostat 34 having a dry bulb 35 operatively connected therewith. The thermostat 34 is provided with a mercury tube switch 43 which is pivoted intermediate its ends at 5 in a casing D and is connected by a series of levers with a diaphragm or bellows (not shown) which in turn is actuated by a thermostatic fluid enclosed in a tube 51 of the dry bulb 35. Wires 36 and 37 are connected at one end with contact members 38, 39 respectively in the casing D of the thermostat 34 and are connected at the other end with a three-way switch 40 in the motor 4 of the valve 33. There are also a pair of contact members 41, 42 in the casing D having connections through wires 44, 45 respectively with a wire 46 whose other end is connected with one pole of an electric socket (not shown) connected with a suitable electric circuit, for instance a lighting circuit. A wire 47 leads from the other pole of the socket to one terminal of the valve motor 4, the other terminal of which is connected to the three-way switch 40. The contact members 38, 39, 41, and 42 are connected to the mercury tube 43 as shown in Fig. 3 and are adapted to be engaged by the mercury m in said tube to start or stop the motor 4 according to the position of the tube.

When the temperature falls below a certain predetermined point the circuit will be closed to start the motor 4 to open the valve 33 and admit steam or other heating medium to the member 14. When the temperature rises above a predetermined degree the circuit which controls the valve will be broken and the heating medium will be shut off from the member 14.

I claim:

1. In a chamber, a heat radiating member, means for heating said heat radiating member, means for circulating and re-circulating air in contact with said radiating member, said chamber having a port which communicates with the outside air, means for positively forcing air through said port, said air forcing means being normally inactive, a wet bulb thermostat in the path of the re-circulating air, means whereby said wet bulb thermostat controls the said air forcing means, said thermostat being so regulated and adjusted that when the wet bulb temperature varies from the predetermined degree the said air forcing means becomes operative to positively force the movement of air through said port.

2. In a drier chamber, a steam heated radiating member, means for circulating and reciculating air in said chamber over said circulating air in said chamber over said radiating member, a thermostat with a dry bulb, means whereby said dry bulb thermostat controls the passage of steam to the heat radiating member and thereby controls the temperature of the air, a wet bulb thermostat in the path of the recirculating air to said heat radiating surface, a passage between the said chamber and the outside air, means for forcing air through said passage and means whereby said wet bulb thermostat controls the operation of said air forcing mechanism to become operative at a predetermined degree of humidity and thereby controls the humidity of the air in the chamber.

3. In a chamber, a heat radiating member, means for heating said heat radiating member, means for causing a circulation and recirculation of air into contact with said heat radiating member, an air passage between the outside air and the said chamber, means for forcing the circulation of air through said passage, a thermostat having a wet bulb and means whereby said thermostat with wet bulb controls the operation of the said means for forcing the circulation of air through said passage.

In testimony whereof I affix my signature.

GEORGE B. BAILEY.